(12) United States Patent
White

(10) Patent No.: US 6,616,326 B2
(45) Date of Patent: Sep. 9, 2003

(54) SHAFT SEALING ASSEMBLY HAVING REPLACEABLE SEALING SLEEVE

(75) Inventor: James E. White, Everton, MO (US)

(73) Assignee: Custom Metalcraft, Inc., Springfield, MO (US)

( * ) Notice: Subject to any disclaimer, the term of this patent is extended or adjusted under 35 U.S.C. 154(b) by 0 days.

(21) Appl. No.: 10/017,233

(22) Filed: Dec. 13, 2001

(65) Prior Publication Data

US 2003/0112703 A1 Jun. 19, 2003

(51) Int. Cl.[7] ............................. B01F 7/00; F16J 15/16
(52) U.S. Cl. ...................... 366/331; 366/608; 277/571
(58) Field of Search .................... 366/331, 608, 366/349, 279; 277/370, 321, 551, 571, 585

(56) References Cited

U.S. PATENT DOCUMENTS

| | | | | |
|---|---|---|---|---|
| 3,612,546 A | * | 10/1971 | Otto | 277/571 |
| 3,773,336 A | * | 11/1973 | Walter et al. | 277/571 |
| 4,850,723 A | * | 7/1989 | Whiteman, Jr. | 366/331 |
| 4,878,677 A | * | 11/1989 | Larkins et al. | 366/331 |
| 5,700,086 A | * | 12/1997 | Forslund | 366/331 |
| 5,735,603 A | * | 4/1998 | Kesig et al. | 366/331 |

* cited by examiner

Primary Examiner—Tony G. Soohoo
(74) Attorney, Agent, or Firm—Hovey Williams. LLP

(57) ABSTRACT

An improved shaft sealing assembly (18) for use with an elongated, axially rotatable shaft (14) typically forming a part of a blender (10) or similar device is provided, which permits rapid, easy seal repair without the need for complete breakdown of the blender (10). The assembly (18) includes a tubular sleeve adapted to be disposed about the shaft (14) at the region of a shaft/blender wall interface, with an annular sealing body (42) disposed about the sleeve (40) in a sealing position and supporting a seal (66) which engages the sleeve (40) at a first sealing location (66a) thereon. A lock device (48) operably to maintain the sealing body (42) in its sealing position is provided, and the sleeve (40) is selectively movable relative to shaft (14) and sealing body (42) so as to change the sealing location from the first location (66a) to a second, different sealing location (66b). The sleeve 40 can also be easily replaced if desired.

29 Claims, 2 Drawing Sheets

SHAFT SEALING ASSEMBLY HAVING REPLACEABLE SEALING SLEEVE

BACKGROUND OF THE INVENTION

1. Field of the Invention

The present invention is broadly concerned with improved seal assemblies for use with elongated, axially rotatable shafts used in blenders or other mixing devices, in order to permit rapid repair of shaft seals without the need for complete breakdown of the blenders. More particularly, the invention is concerned with such seal assemblies, as well as corresponding shaft assemblies and blending devices, wherein the shaft seal assemblies include a replaceable tubular sleeve adapted to be disposed about a shaft and is rotatable therewith, in conjunction with an annular sealing body disposed about the sleeve and supporting a seal at a first sealing location. A locking device is provided for maintaining the sealing body in a shaft-sealing position, and the sleeve is selectively movable relative to the shaft so as to change the sealing location from the first to a different, second sealing location.

2. Description of the Prior Art

Food and pharmaceutical manufacturers commonly make use of large blending or mixing devices which include an upright tank as well as one or more elongated mixing shafts extending into the confines of the tank. For reasons of sanitation, such mixing shafts are typically fabricated from stainless steel material. In any case, in order to obtain the necessary, fluid-tight seal, the mixing shafts are equipped with stationary elastomeric external seals. A problem arises, however, because of the fact that stainless steel is a relatively soft material. Thus, during rotation of the mixing shafts, a groove or indentation is worn in the shaft at the region of the surrounding seals. When this occurs, the overall seal degrades and begins to leak. This necessitates essentially a complete blender teardown because of the need to replace the shaft or at least remachine the shaft. This is an expensive proposition not only from the standpoint of repair costs, but also because of blender downtime.

It has been suggested in the past to heat treat the stainless steel mixing shafts in order to extend the useful lives thereof. While such heat treating does harden the shafts, it is very expensive and thus has not been widely practiced.

There is accordingly a need in the art for an improved shaft sealing assembly which permits rapid sealed repair without the need for complete blender breakdown, while avoiding the undue expense of heat treating blender shafts.

SUMMARY OF THE INVENTION

The present invention overcomes the problems outlined above, and provides a seal assembly for an elongated, axially rotatable shaft such as those used in blender or like devices, and which efficiently solves the seal repair problem. Broadly speaking, the seal assembly of the invention includes a tubular sleeve adapted to be disposed about the shaft and is rotatable therewith, in conjunction with an annular sealing body disposed about the sleeve in a sealing position and supporting a resilient seal which engages the sleeve at a first sealing location thereon. A locking device is used to maintain the sealing body in the sealing position. In use, the sleeve is selectively movable relative to the shaft and sealing body so as to change the sealing location thereon from the first sealing location to a second, different sealing location.

In preferred forms, an interlock is provided between the sealing body and sleeve in order to selectively lock the sleeve relative to the sealing body. This interlock structure advantageously takes the form of two or more axially spaced apart grooves formed in the exterior surface of the sleeve, and a complemental locking projection or lug on the sealing body; the lug is alternately received in the grooves in order to vary the sealing location presented by the sleeve. The locking device is preferably in the form of an apertured plate engaging the exterior of the sealing body, with releasable retainers or clamping the plate against the sealing body.

In use, the sleeve is telescoped onto the mixing shaft, preferably through the use of a key/keyway interconnection, and the sealing body is positioned about the sleeve so that a seal carried by the body engages the sleeve at a first location. The locking device is then attached to complete the assembly. As the shaft rotates and a groove or indentation is formed in the sleeve, a leak may develop. When this occurs, it is only necessary to disassemble the seal assembly and shift the sleeve to present a second, different sealing location for the sealing body upon reassembly.

The invention also permits complete removal and replacement of the tubular sleeve, thereby even further extending shaft life. Finally, inasmuch as the replaceable sleeve is a relatively small, usually stainless steel component, heat treatment of the sleeve is economically justifiable.

BRIEF DESCRIPTION OF THE DRAWINGS

FIG. 3 is a fragmentary vertical section similar to that of FIG. 2 but illustrating the sealing assembly in a position shifted as compared with that illustrated in FIG. 2; and FIG. 4 is a fragmentary view in partial vertical section illustrating the key and keyway assembly employed in the preferred sealing assembly of the invention.

DETAILED DESCRIPTION OF THE PREFERRED EMBODIMENT

Figure 1:
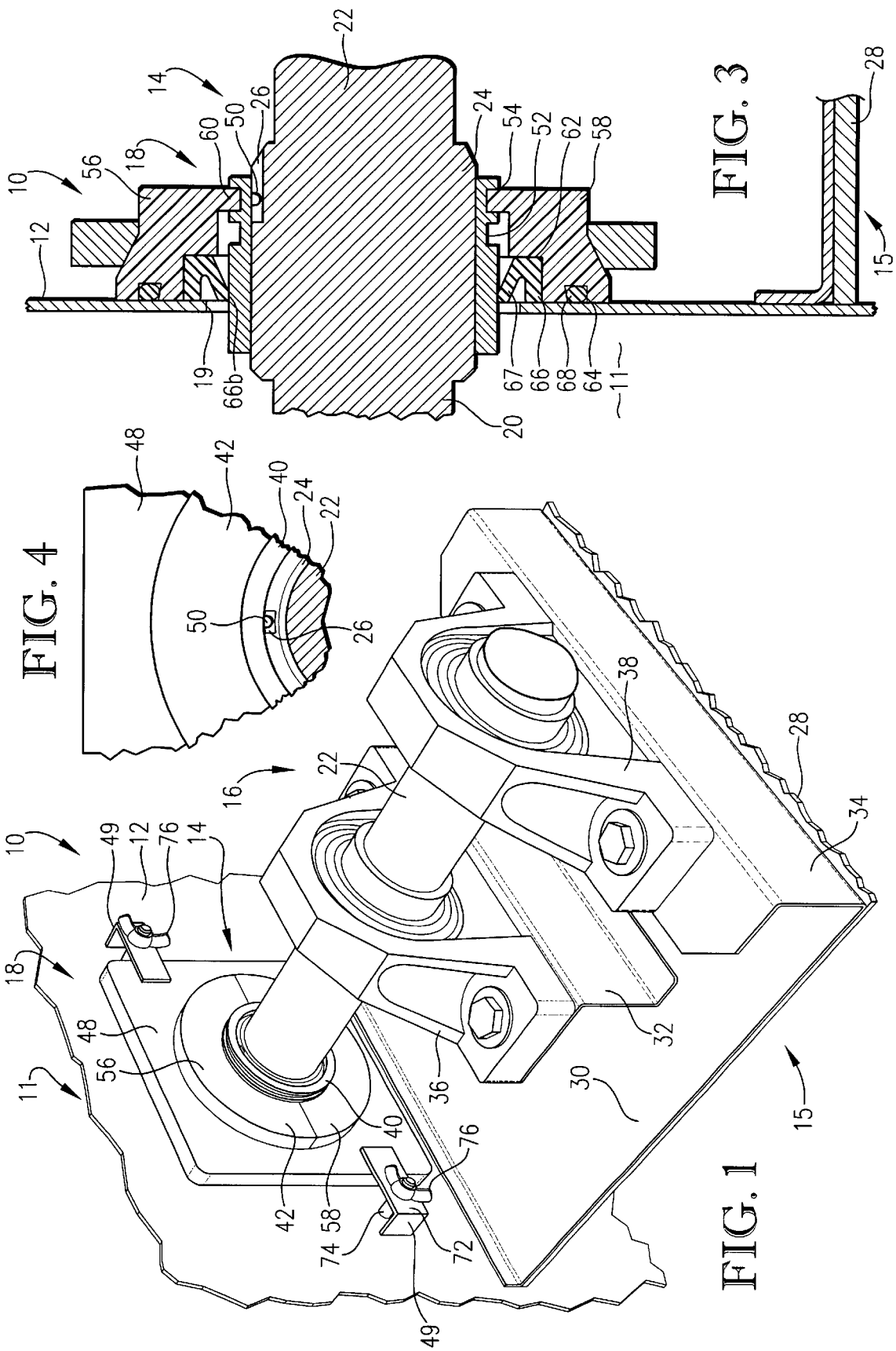
FIG. 1 is a fragmentary, perspective view illustrating a food-grade blending device equipped with an elongated, axially rotatable blending shaft, the shaft having the sealing assembly of the invention mounted therein.
Figure 2:
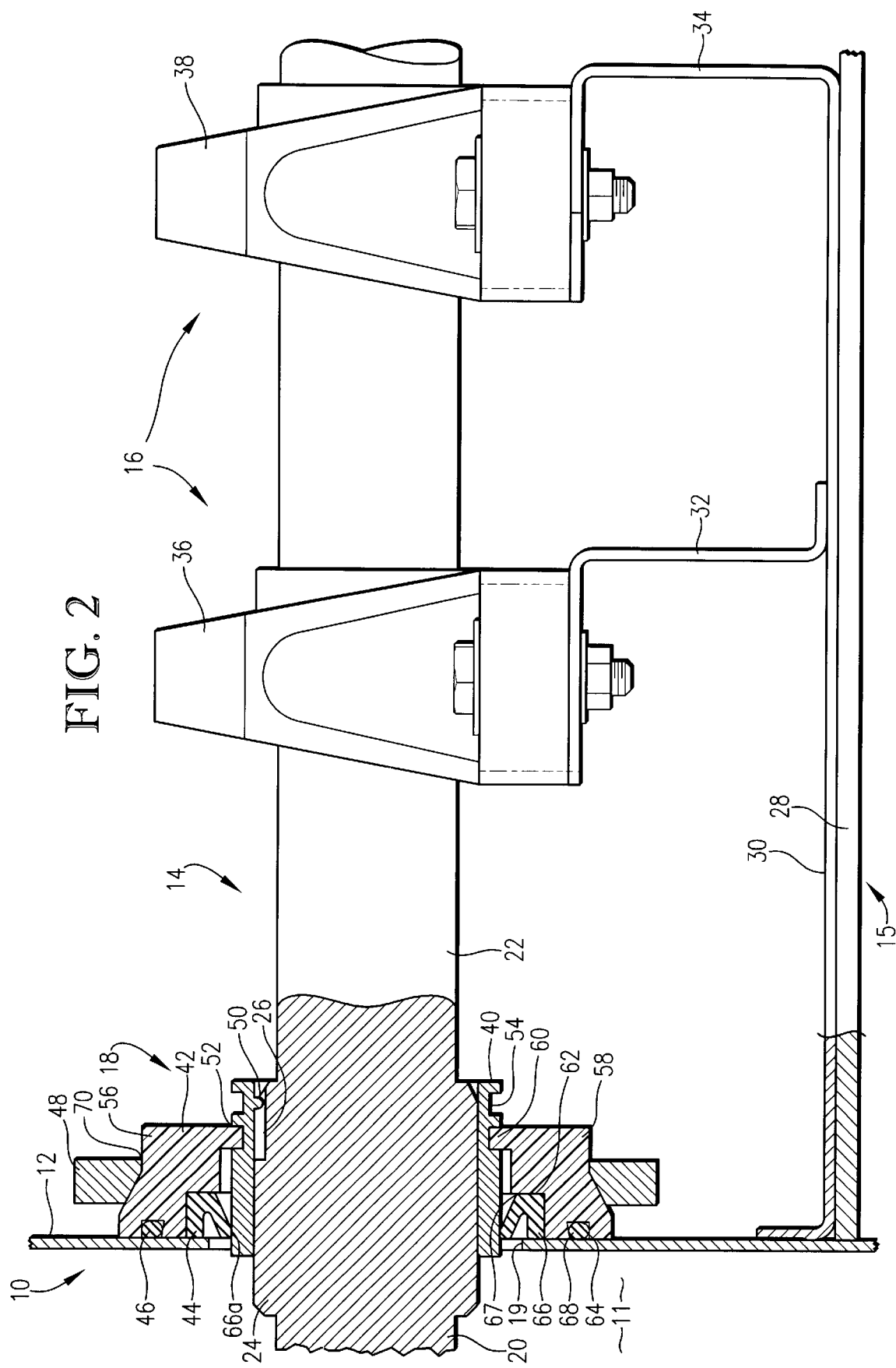
FIG. 2 is a fragmentary view in partial vertical section of the device illustrated in FIG. 1, and depicting in detail the construction of the sealing assembly.

Turning now to the drawings, FIGS. 1 and 2 illustrate a food-grade blending device 10 having a tank 11 defined by wall structure 12 as well as an elongated shaft 14 extending through wall structure 12 and into the confines of tank 11. The shaft 14 is supported externally of the blending tank by means of support structure 15 and bearings 16, and a sealing assembly 18 in accordance with the invention is located at the interface between wall structure 12 and shaft 14, in order to provide a fluid-tight seal.

In more detail, the device 10 can be any one of a wide variety of blending devices used in the food or other industries for mixing, compounding, blending or otherwise treating materials within the tank 11. Generally, such devices include walls such as the wall structure 12 defining an internal, upright tank or the like with a shaft-receiving opening 19 therethrough. It will thus be appreciated that the invention is not in any way limited to particular blending devices or intended end uses, but rather can be used in virtually any kind of blender or similar device for shaft-sealing purposes The shaft 14 includes an elongated section 20 within the tank 11 and typically would carry a plurality of outwardly extending mixing or blending elements such as paddles or the like (not shown). In addition, the shaft 14 has an external, stepped section 22 which is supported by the bearings 16 and is also connected to a drive motor (not shown). Finally, shaft 14 has a radially enlarged section 24 between sections 20 and 22 and generally at the interface of the wall structure 12. This enlarged section 24 includes an elongated keyway slot 26 which extends along the length of the shaft. In the illustrated embodiment, the shaft 14 is integrally formed of stainless steel; however, it will be understood that sectionalized shafts could also be employed, as well as shafts fabricated from materials other than stainless steel.

The support structure 15 is illustrated only schematically in the drawings, and includes a primary support plate 28 affixed to wall structure 12, together with first and second metallic webs 30 32. As best seen in FIGS. 1 and 2, the web 30 is secured in a face-to-face relationship with plate 28 and has an outermost upstanding flange 34. The web 32 is secured to web 30 and also defines an upstanding flange. The bearings 16 are respectively supported by the webs 30, 32, and in the form shown are conventional pillow block bearings 36, 38. Those skilled in the art will appreciate that a variety of different support structures could be employed in the context of the invention, depending upon the nature or size of the equipment and intended uses thereof. These considerations are conventional in the equipment art.

Sealing assembly 18 includes a tubular metallic sleeve 40 telescoped over shaft section 24, synthetic resin (e.g., Delrin) seal body or retainer 42 carrying seals 44, 46, and a metallic retainer plate 48 releasably secured in place by exemplary retainer clips 49; again, a wide variety of retainer structures could be used in this context. The sleeve 40 is preferably but not necessarily formed of stainless steel (which may be heat treated if desired) and includes an inwardly extending key 50 which is slidably received within keyway 26 of shaft section 24. The outer surface of the sleeve 40 is provided with a pair of axially spaced apart peripheral grooves 52, 54 located near the outer end of the sleeve.

The seal retainer 42 is annular in configuration and made up of a pair of generally semicircular retainer halves 56, 58. The halves 56, 58, when joined as illustrated in the drawings, cooperatively define an inwardly extending, circumferentially extending locking lug 60 as well as a pair of seal-receiving grooves 62, 64 in facing relationship to wall structure 12 and opening 19. A primary, one-piece, split elastomeric seal 66 is housed within groove 62 and has an inwardly extending arcuate leg 67 which engages the outer surface of sleeve 40, thus defining the primary seal for the shaft 14. There is no criticality in the specific seal configuration, and a variety of different seals could be employed. A secondary continuous O-ring seal 68 is located within groove 64 and is in abutting, face-to-face contact with the exterior surface of wall structure 12.

The retainer plate 48 has a central opening 70 therethrough which mates with the exterior surface of seal retainer 42 (see FIGS. 2 and 3). The plate 48 is releasably clamped and secured in place by the clips 49, each including a generally L-shaped retainer 72 with an adjacent threaded stud 74 and wing nut 76, so that tightening of the nuts 76 clamps the plate 48 into engagement with the bifurcated seal retainer 42.

The use of sealing assembly 18 is best illustrated in FIGS. 2 and 3. Referring first to FIG. 2, it will be observed that the seals 66, 68 are located within the corresponding grooves 62, 64, with inwardly extending locking lug 60 extending into groove 52. The retainer plate 48 and clips 49 serve to clamp the plate against the seal retainer 42, thereby insuring that the entire construction effects a fluid-tight seal at the area of tank wall opening 19. As the shaft 14 is rotated during use of the blending device, the sleeve 40 rotates with the shaft because of the key/keyway interconnection between these components. The inward leg 67 of seal 66 maintains the required seal during this rotation at a first sealing location 66a, but over time the sleeve becomes worn at the location 66a and the tank seal degrades and begins to leak. At this point, the assembly 18 is disassembled and the sleeve 40 is shifted leftwardly to the FIG. 3 position using the key/keyway interconnection, so that, upon reassembly, the locking lug 60 is inserted into groove 54. This means that the seal leg 67 comes into contact with sleeve 40 at a second sealing location 66b thereon spaced relative to the original sealing location 66a. Thus, the assembly 18 permits the user to very rapidly solve the problem of seal wear without the necessity of a complete breakdown of the shaft and supporting structure.

Periodic cleaning of the shaft 14 and sleeve 40 (which typically occurs on a daily basis with food processing equipment) is facilitated because of the enlarged section 24. That is, during such cleaning the sleeve 40 is withdrawn from the section 24, thereby leaving substantial clearan-ce between the shaft 22 and the inner surface of the sleeve 40. As a consequence, typical pressurized cleaning equipment can be used to rapidly clean the sleeve 40 and section 24, while the sleeve remains on the shaft 22.

It will thus be appreciated that the invention overcomes a long-standing problem in the art and allows use of stainless steel or other soft metal shafts while minimizing down time related to seal wear. Although in the embodiment illustrated, only a pair of locking grooves 52, 54 are shown, those skilled in the art will understand that a greater number of such grooves, and a correspondingly longer sleeve 40 could be used to obtain even longer seal assembly life. Finally, the simple nature of the sealing assembly construction permits complete replacement of the sleeve 40 as the occasion demands.

I claim:

1. A shaft assembly, comprising:
   an elongated, axially rotatable shaft: and
   a seal assembly for said shaft, including
      a tubular sleeve disposed about said shaft and rotatable therewith;
      an annular sealing body disposed about said sleeve in a sealing position and supporting a seal which engages the sleeve at a first sealing location thereon; and
      a locking device operable to maintain said sealing body in said sealing position,
      said sleeve being selectively movable relative to said shaft and sealing body so as to change said sealing location from said first sealing location to a second, different sealing location.

2. The shaft assembly of claim 1, including interlock structure between said sealing body and sleeve in order to selectively lock the sleeve relative to the sealing body.

3. The shaft assembly of claim 2, said interlock structure comprising at least two axially spaced apart grooves formed in said sleeve, and a locking projection on said body, said projection being alternately received in said grooves.

4. The shaft assembly of claim 1, said sealing body supporting a second seal spaced from said sleeve-engaging seal.

5. The shaft assembly of claim 1, said locking device comprising an apertured plate engaging said sealing body.

6. The shaft assembly of claim 1, one of said shaft and sleeve having an elongated keyway formed therein, the other of said shaft and sleeve having a cooperating key extending into said keyway, said keyway and key permitting said selective movement of said sleeve.

7. The shaft assembly of claim 1, said sleeve being removable from said shaft and replaceable with another sleeve.

8. The shaft assembly of claim 1, said sleeve-engaging seal being formed of elastomeric material.

9. The shaft assembly of claim 1, including a bearing assembly supporting said shaft for axial rotation thereof.

10. The shaft assembly of claim 1, said shaft presenting a radially enlarged section, said sleeve disposed about said enlarged section.

11. A seal assembly for an elongated, axially rotatable shaft, said seal assembly comprising:
   a tubular sleeve adapted to be disposed about said shaft and rotatable therewith;
   an annular sealing body disposed about said sleeve in a sealing position and supporting a seal which engages the sleeve at a first sealing location thereon; and
   a locking device operable to maintain said sealing body in said sealing position,
   said sleeve being selectively movable relative to said shaft and sealing body so as to change said sealing location from said first sealing location to a second, different sealing location.

12. The seal assembly of claim 11, including interlock structure between said sealing body and sleeve in order to selectively lock the sleeve relative to the sealing body.

13. The seal assembly of claim 11, said interlock structure comprising at least two axially spaced apart grooves formed in said sleeve, and a locking projection on said body, said projection being alternately received in said grooves.

14. The seal assembly of claim 11, said sealing body supporting a second seal spaced from said sleeve-engaging seal.

15. The seal assembly of claim 11, said locking device comprising an apertured plate engaging said sealing body.

16. The seal assembly of claim 11, one of said shaft and sleeve having an elongated keyway formed therein, the other of said shaft and sleeve having a cooperating key extending into said keyway, said keyway and key permitting said selective movement of said sleeve.

17. The seal assembly of claim 11, said sleeve being removable from said shaft and replaceable with another sleeve.

18. The seal assembly of claim 11, said sleeve-engaging seal being formed of elastomeric material.

19. The seal assembly of claim 11, said shaft presenting a radially enlarged section, said sleeve disposed about said enlarged section.

20. A blender comprising:
   a tank for receiving one or more materials to be blended and having an apertured tank wall;
   an elongated, axially rotatable shaft extending through said apertured tank wall and into the confines of said tank;
   a seal assembly for said shaft, including
      a tubular sleeve disposed about said shaft and rotatable therewith;
      an annular sealing body disposed about said sleeve in a sealing position and supporting a seal which engages the sleeve at a first sealing location thereon; and
      a locking device operable to maintain said sealing body in said sealing position,
      said sleeve being selectively movable relative to said shaft and sealing body so as to change said sealing location from said first sealing location to a second, different sealing location.

21. The blender of claim 20, including interlock structure between said sealing body and sleeve in order to selectively lock the sleeve relative to the sealing body.

22. The blender of claim 21, said interlock structure comprising at least two axially spaced apart grooves formed in said sleeve, and a locking projection on said body, said projection being alternately received in said grooves.

23. The blender of claim 20, said sealing body supporting a second seal spaced from said sleeve-engaging seal and engaging said tank wall.

24. The blender of claim 20, said locking device comprising an apertured plate engaging said sealing body.

25. The blender of claim 20, one of said shaft and sleeve having an elongated keyway formed therein, the other of said shaft and sleeve having a cooperating key extending into said keyway, said keyway and key permitting said selective movement of said sleeve.

26. The blender of claim 20, said sleeve being removable from said shaft and replaceable with another sleeve.

27. The blender of claim 20, said sleeve-engaging seal being formed of elastomeric material.

28. The blender of claim 20, including a bearing assembly supporting said shaft for axial rotation thereof.

29. The blender of claim 20, said shaft presenting a radially enlarged section, said sleeve disposed about said enlarged section.

* * * * *